United States Patent [19]
Nakashima

[11] Patent Number: 6,073,604
[45] Date of Patent: Jun. 13, 2000

[54] COMBUSTION CHAMBER STRUCTURE OF A GAS ENGINE

[75] Inventor: Kenro Nakashima, Kanagawa-ken, Japan

[73] Assignee: Isuzu Ceramics Research Institute Co., Ltd., Kanagawa-ken, Japan

[21] Appl. No.: 09/135,801

[22] Filed: Aug. 18, 1998

[30] Foreign Application Priority Data

Sep. 8, 1997 [JP] Japan ................................ 9-257975

[51] Int. Cl.$^7$ ............................................ F02B 19/02
[52] U.S. Cl. ........................................ 123/292; 123/270
[58] Field of Search .................................... 123/292, 272, 123/270

[56] References Cited

U.S. PATENT DOCUMENTS 4,854,281  8/1989  Hareyama et al. .................. 123/292
5,454,356  10/1995 Kawamura ......................... 123/292

Primary Examiner—John Kwon
Attorney, Agent, or Firm—Browdy and Neimark

[57] ABSTRACT

In the combustion chamber structure of the gas engine the combustion chamber members are formed with the sub-communication holes allowing communication between the main combustion chambers and the pre-combustion chambers and also with throat holes in which throat hole valves are installed. This structure avoids excessively high compressed air pressure in the main combustion chambers during the compression stroke and reduces the compression work to improve performance. The sub-communication holes open at the wall surfaces situated in the main combustion chambers and also at the upper wall surfaces of the pre-combustion chambers. The axes of the ports of the sub-communication holes opening to the main combustion chambers extend toward the center axes of the throat holes. The axes of the ports of the sub-communication holes opening to the pre-combustion chambers extend offset from the center axes of the pre-combustion chambers. Hence, this gas engine can reduce the compression work, lower the maximum pressure of the compressed air at the end of the compression stroke, prevent the gas fuel from remaining in the pre-combustion chambers, and enhance the air utilization factor, improving thermal coefficient.

6 Claims, 3 Drawing Sheets

COMBUSTION CHAMBER STRUCTURE OF A GAS ENGINE

BACKGROUND OF THE INVENTION

1. Field of the Invention

The present invention relates to a combustion chamber structure of a gas engine, in which a gas fuel is supplied to a pre-combustion chamber with the communication between the main combustion chamber and the pre-combustion chamber cut off, followed by a throat hole being opened to introduce air into the pre-combustion chamber to mix the air and the gas fuel for ignition and combustion.

2. Description of the Prior Art

Gas engines with a lean-fuel combustion scheme have been developed to realize reduced NOx emissions and high efficiency. Such engines include those having a gas mixer in an intake manifold and burning the fuel in the Otto cycle and those having a pre-combustion chamber into which a gas fuel is supplied for combustion.

For example, Japanese Patent Laid-Open No. 310550/1995 filed by this applicant discloses such a gas engine.

The gas engine disclosed in the Japanese Patent Laid-Open No. 310550/1995 introduces a gas fuel such as natural gas into a pre-combustion chamber, compresses only the intake air in the main combustion chamber to a high compression ratio, detects the cylinder inner pressure in the pre-combustion chamber with a sensor such as piezoelectric element, operates based on this information a fuel supply valve to control the fuel supply to an appropriate amount according to the load and revolution, with the air in the main combustion chamber heated to a high temperature, opens the throat hole valve to allow the highly compressed air to flow into the pre-combustion chamber so that the gas fuel in the pre-combustion chamber can be mixed at once with the highly compressed air and ignited and burned in a short period of time. With this process, an excessively rich air-fuel mixture is burned in the pre-combustion chamber to suppress the production of NOx and flames are blown out quickly from the pre-combustion chamber into the main combustion chamber to effect the secondary combustion under as uniform an air-fuel mixture condition as possible and complete it in a short period, thereby reducing the production of NOx and HC and improving thermal efficiency.

In the above gas engine, it is necessary to supply a gas fuel into the pre-combustion chamber when the pressure in the pre-combustion chamber is low with the throat hole valve closed and, in the latter half of the compression stroke, to open the throat hole valve to supply high-temperature, high-pressure air into the pre-combustion chamber to mix the air and the gas fuel rapidly and cause self-ignition of the mixture so that the burning mixture blows out into the main combustion chamber by the rising pressure caused by combustion in the pre-combustion chamber thus completing the lean-fuel combustion in a short period of time.

With the above gas engine, however, because the throat hole valve is opened in the latter half of the compression stroke, the actual compression ratio in the main combustion chamber becomes high increasing the compression work done by the piston, which is consumed in friction and other losses, so that the net effective work decreases, degrading the thermal efficiency.

To solve the above problem with the conventional gas engines, it is conceivable to open the throat hole valve early in the compression stroke to introduce the compressed air from the main combustion chamber to the pre-combustion chamber. This however results in a phenomenon in which the gas fuel in the pre-combustion chamber disperses into the main combustion chamber entering into crevice regions of the piston, which is considered detrimental to improving the combustion performance. From the standpoint of suppressing the production of NOx, lean fuel is preferable for the gas engines and, to effect the lean fuel combustion using a gas fuel, reliable ignition and rapid combustion of lean air-fuel mixture are essential.

SUMMARY OF THE INVENTION

An object of this invention is to solve the above problems and to provide a combustion chamber structure of a gas engine in which throat hole valves are installed in throat holes allowing communication between the main combustion chambers and the pre-combustion chambers; in which in addition to the throat holes, sub-communication holes are formed to allow communication between the main combustion chambers and the pre-combustion chambers so that during the compression stroke, prior to the opening of the throat holes by the throat hole valves, a part of the gas fuel is ejected from the pre-combustion chambers into the main combustion chambers through the sub-communication holes, i.e., into the central part of the cylinder and then a part of the compressed air is supplied, in such an amount as not to cause self-ignition of the gas fuel in the pre-combustion chambers, to the pre-combustion chambers from the main combustion chambers through the sub-communication holes, thereby preventing the pressure of the compressed air in the main combustion chambers from rising excessively high; and in which the throat hole valves are operated near the top dead center during the compression stroke to open the throat holes to supply the compressed air from the main combustion chambers to the pre-combustion chambers to ignite and burn the air-fuel mixture, thereby enhancing the air utilization factor, the combustion efficiency and therefore the thermal efficiency.

The present invention relates to a combustion chamber structure of a gas engine, which comprises: combustion chamber members installed in a cylinder head and formed with main combustion chambers and pre-combustion chambers communicating with the main combustion chambers; throat holes formed in the combustion chamber members to allow communication between the main combustion chambers and the pre-combustion chambers; throat hole valves to open and close the throat holes; fuel supply ports opening to the pre-combustion chambers to supply a gas fuel to the pre-combustion chambers; fuel supply valves to open and close the fuel supply ports; and sub-communication holes opening at wall surfaces of the throat holes situated in the main combustion chambers and at upper wall surfaces of the pre-combustion chambers to allow communication between the main combustion chambers and the pre-combustion chambers.

In this combustion chamber structure of this gas engine, axes of the sub-communication holes opening at the main combustion chambers extend toward the centers of the throat holes. Further, axes of the sub-communication holes opening at the pre-combustion chambers extend offset from the center axes of the pre-combustion chambers.

Valve stems of the throat hole valves extending along the center axes of the pre-combustion chambers are formed with raised portions around the circumference of the valve stem.

The sub-communication holes are provided with pressure control valves that open the sub-throat holes in response to a gas pressure in the main combustion chambers which is a predetermined value higher than a gas fuel pressure in the pre-combustion chambers. The pressure control valves installed in the sub-communication holes open the sub-communication holes when the gas pressure in the main combustion chambers is a predetermined value higher than the gas fuel pressure in the pre-combustion chambers to prevent excess gas fuel from flowing into the main combustion chambers, thereby eliminating the possibility of pre-ignition.

The combustion chamber members comprise a head underside portion and a liner upper portion integrally formed with the head underside portion, both being made of ceramics.

The throat holes comprise throat port portions situated on the pre-combustion chamber side, center throat hole portions situated on the main combustion chamber side where the throat hole valves reciprocate, and communication grooves extending radially from the center throat hole portions toward cylinder periphery of the main combustion chambers.

In the gas engine having the above combustion chamber structure, up until the first half of the compression stroke where the gas pressure in the pre-combustion chambers is higher than the air pressure in the main combustion chambers, the gas fuel supplied to the pre-combustion chambers is ejected out, in such a flow rate as not to cause self-ignition, into the main combustion chambers through the sub-communication holes to distribute the gas fuel to the main combustion chambers and the pre-combustion chambers, and then during the compression stroke where the air pressure in the main combustion chambers is higher than the gas pressure in the pre-combustion chambers, a part of the compressed lean air-fuel mixture is supplied, in such an amount as not to cause self-ignition, to the pre-combustion chambers from the main combustion chambers through the sub-communication holes to prevent the compressed air pressure from rising excessively high in the main combustion chambers, thereby reducing the maximum pressure of the compressed air in the main combustion chambers.

In the gas engine with the above combustion chamber structure, because the sub-communication holes are provided in addition to the throat holes that allow communication between the main combustion chambers and the pre-combustion chambers and in which the throat hole valves are installed, when during the intake and compression strokes the gas pressure in the pre-combustion chambers is higher than the air pressure in the main combustion chambers, a part of the gas fuel can be held temporarily at the central part of the cylinder in the main combustion chambers and the air utilization in the main combustion chambers can be improved. At the same time, it is possible to prevent the gas fuel from remaining in the pre-combustion chambers, and the ability to temporarily keep the gas fuel in the central central area of the cylinder can prevent the gas fuel from dispersing to the periphery of the main combustion chambers and from entering the crevices of the piston. This in turn allows improvements to be made of combustion and therefore thermal efficiency. Furthermore, the introduction during the compression stroke of a part of the lean mixture or compressed air from the main combustion chambers into the upper part of the pre-combustion chambers can prevent the compressed air pressure in the main combustion chambers from rising excessively high, which in turn reduces friction and compression work and thereby improves the performance of the engine.

DETAILED DESCRIPTION OF THE EMBODIMENT

Now, with reference to the accompanying drawings embodiments of the combustion chamber structure of the gas engine according to this invention will be described.

Figure 1:
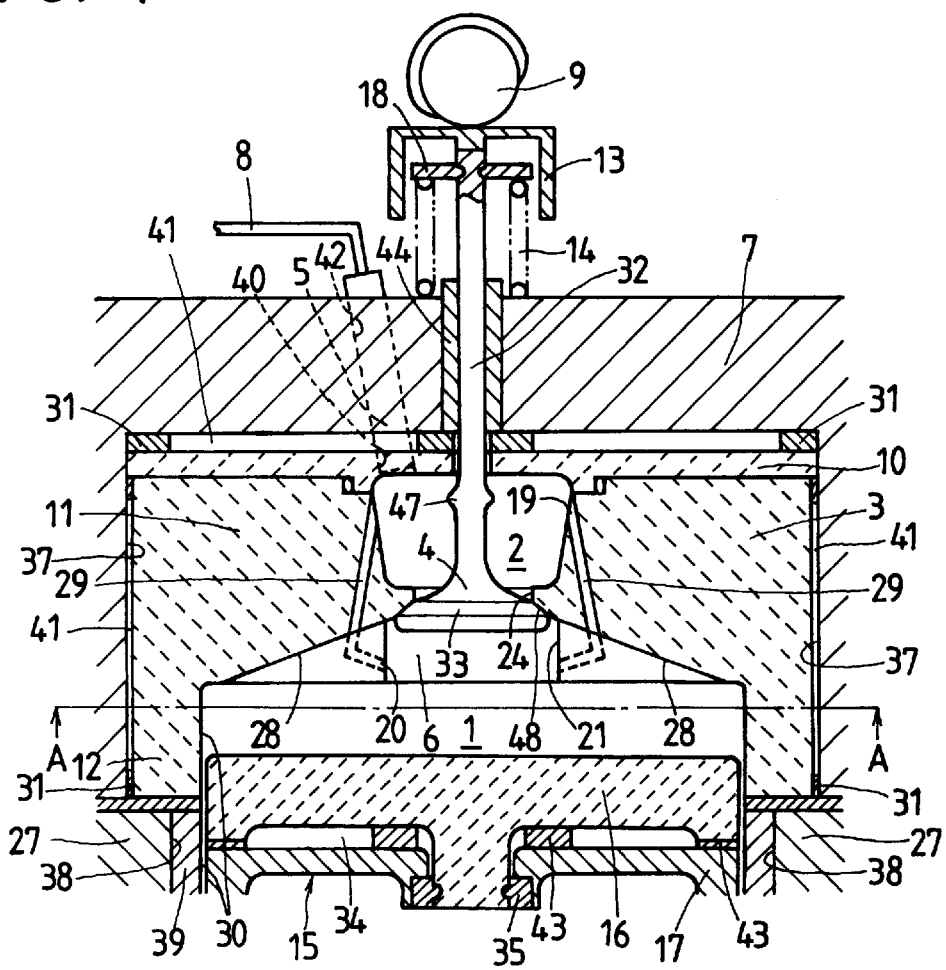
FIG. 1 is a cross section showing one embodiment of the combustion chamber structure of the gas engine according to this invention.
Figure 2:
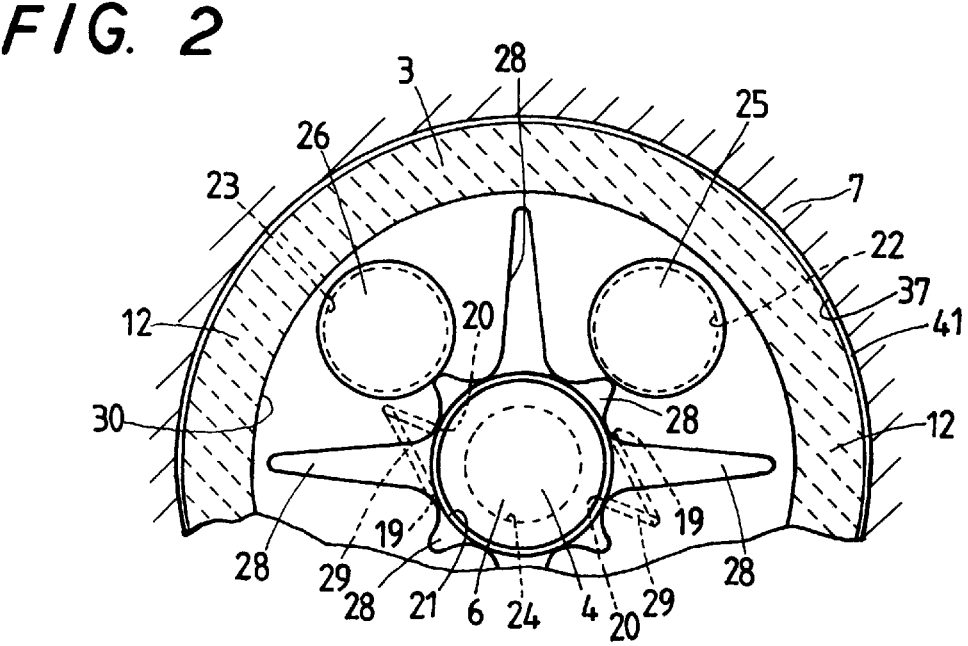
FIG. 2 is a cross section taken along the line A—A of FIG. 1, showing the underside of the combustion chamber member.

First, referring to FIGS. 1 and 2, the first embodiment of the combustion chamber structure of the gas engine of this invention will be explained.

The gas engine with this combustion chamber structure includes a cylinder head 7 secured to a cylinder block 27, a combustion chamber member 3 installed through a gasket 31 in a cavity 37 formed in the cylinder head 7, a cylinder liner 39 fitted in a bore portion 38 formed in the cylinder block 27, and a piston 15 reciprocating in a cylinder 30 formed in the cylinder liner 39. The combustion chamber member 3 is formed with two intake ports 22 (one is shown in FIG. 2) and two exhaust ports 23 (one is shown in FIG. 2), which are opened and closed by intake valves 25 and exhaust valves 26, respectively. The piston 15 comprises a piston head 16 of ceramics of, for example, silicon nitride with excellent heat resistance and a piston skirt 17 secured to the piston head 16 by a coupling ring 35 through metal flow. A gasket 43 is interposed between the piston head 16 and the piston skirt 17 to form a heat insulating air layer 34.

The combustion chamber member 3 comprises a liner upper portion 12 that forms a part of the cylinder 30, and a head underside portion 11. A main combustion chamber 1 is formed in the liner upper portion 12 forming a part of the cylinder 30, and a pre-combustion chamber 2 is formed in the center of the head underside portion 11. Around the combustion chamber member 3 is formed a heat insulating air layer 41 to make the main combustion chamber 1 and the pre-combustion chamber 2 heat insulative. The combustion chamber member 3 is formed with a throat hole 6 that allow communication between the main combustion chamber 1 and the pre-combustion chamber 2. The throat hole 6 comprises a throat hole portion 24 on the pre-combustion chamber 2 side, a center throat hole portion 21 on the main combustion chamber 1 side, and communication grooves 28 extending radially from the center throat hole portion 21. Between the throat hole portion 24 and the center throat hole portion 21 is formed a valve seat 48 on which a throat hole valve 4 is seated. Integrally formed with the upper surface of the combustion chamber member 3 is a plate 10 which forms an upper wall of the pre-combustion chamber 2 and has a gas fuel supply port 40 communicating with a gas fuel supply pipe 8 to supply a gas fuel to the pre-combustion chamber. The gas fuel supply port 40 is provided with a fuel supply valve 5.

This gas engine has a fuel source, though not shown, accommodating natural gas as a fuel. A fuel supply passage 42 communicating with the gas fuel supply pipe 8 for feeding the natural gas from the fuel source is formed in the cylinder head 7. The gas fuel from the fuel source is supplied through the gas fuel supply pipe 8 and the gas fuel supply port 40 formed in the combustion chamber member 3 and into the pre-combustion chamber 2. In the gas fuel supply port 40 is installed a fuel nozzle or the fuel supply valve 5 to open or close the port. When the fuel supply valve 5 is activated to open the gas fuel supply port 40, the gas fuel is fed from the fuel supply passage 42 through the gas fuel supply port 40 to the pre-combustion chamber 2.

The combustion chamber member 3 is formed with the throat hole 6 for communication between the main combustion chamber 1 and the pre-combustion chamber 2. The throat hole valve 4 is installed in the throat hole 6 to open and close the port. The throat hole 6 comprises the center throat hole portion 21 forming a part of the main combustion chamber 1 and the throat hole portion 24 forming a part of the pre-combustion chamber 2. The throat hole valve 4 is set to be seated on the valve seat 48 formed between the center throat hole portion 21 on the main combustion chamber 1 side in which the throat hole valve 4 is reciprocated and the throat hole portion 24 forming a part of the pre-combustion chamber 2. Further, the center throat hole portion 21 is formed with a plurality of communication grooves 28 circumferentially spaced apart from one another and extending radially toward the periphery of the cylinder 30 of the main combustion chamber 1.

The throat hole valve 4 comprises a valve head 33 and a valve stem 32. The valve stem 32 extends through a valve guide 44 installed in the cylinder head 7 above the cylinder head 7. The valve stem 32 of the throat hole valve 4 extending at the center of the pre-combustion chamber 2 is formed with a raised portion 47 around the outer circumferential surface of the valve stem 32. The valve stem 32 is securely provided with a valve spring seat 18. Between the valve spring seat 18 and the upper surface of the cylinder head 7 is arranged a valve spring 14 that urges the throat hole valve 4 to close the throat hole 6.

Above the valve stem 32 is installed a cam 9 as a valve drive mechanism with a tappet 13 interposed therebetween. The face of the throat hole valve 4 is set so as to be seated on the valve seat 48 formed between the throat hole portion 24 and the center throat hole portion 21. The throat hole valve 4 is moved up and down by the cam 9 rotated in synchronism with the rotation of the engine with the valve stem 32 guided by the valve guide 44, to open and close the throat hole 6. The cam 9 may be driven by the same cam shaft that drives the intake valves 25 and the exhaust valves 26.

This gas engine is characterized by a plurality of sub-communication holes 29 formed in the combustion chamber member 3 to allow communication between the main combustion chamber 1 and the pre-combustion chamber 2. The sub-communication holes 29 have a port 20 opening at the wall surface of the throat hole situated on the main combustion chamber 1 side, i.e., the center throat hole portion 21, and a port 19 opening at the upper wall surface of the pre-combustion chamber 2. The axes of the ports 20 of the sub-communication holes 29 extend toward the center of the center throat hole portion 21. The axes of the ports 19 of the sub-communication holes 29 opening on the pre-combustion chamber 2 side extend offset from the center of the pre-combustion chamber 2.

The combustion chamber structure of the gas engine with the above construction is operated as follows. This gas engine is operated by repeating four strokes—intake, compression, power and exhaust—successively. During the intake stroke the intake valves 25 open the intake ports 22 introducing intake air into the main combustion chamber 1. With the throat hole 6 closed by the throat hole valve 4, the fuel supply valve 5 is operated to open the gas fuel supply port 40 to supply a gas fuel such as natural gas from the gas source through the gas fuel supply pipe 8 and the fuel supply passage 42 into the pre-combustion chamber 2. If at this time the gas pressure in the pre-combustion chamber 2 is higher than the air pressure in the main combustion chamber 1, the gas fuel slightly flows from the pre-combustion chamber 2 into the main combustion chamber 1 through the sub-communication holes 29.

Next, in this gas engine, the throat hole 6 is closed by the throat hole valve 4 during the compression stroke. In the first half of the compression stroke the gas pressure in the pre-combustion chamber 2 is higher than the air pressure in the main combustion chamber 1, so the gas fuel flows from the pre-combustion chamber 2 into the center throat hole portion 21 in the main combustion chamber 1 through the sub-communication holes 29. As the compression stroke progresses and the air drawn in is compressed in the main combustion chamber 1, the lean air-fuel mixture in such an amount as not to cause self-ignition is supplied, this time, from the main combustion chamber 1 to the upper part of the pre-combustion chamber 2 through the sub-communication holes 29.

Next, at the end of the compression stroke the throat hole valve 4 opens the throat hole 6, at which time the compressed air, heated to a high temperature by high compression, flows from the main combustion chamber 1 into the pre-combustion chamber 2 via the port 6 to mix with the gas fuel in the pre-combustion chamber 2, creating excessively rich mixtures in the intermediate and lower parts of the pre-combustion chamber 2. Because the lean mixture has already flowed into the upper part of the pre-combustion chamber 2, a combustible mixture is easily formed there. The upper part of the pre-combustion chamber 2 is thus ignited and burned, rapidly spreading the combustion in the pre-combustion chamber 2, burning the rich mixture and producing a minimal amount of NOx. Then, the flames in the upper part of the pre-combustion chamber 2 ejects the over-rich mixture in the intermediate and lower parts out into the main combustion chamber 1, proceeding to the power stroke. The burning mixture rapidly mixes with fresh air present in the main combustion chamber 1, completing the secondary combustion in a short period of time. In the power stroke, the throat hole 6 is kept open to allow the flames to be ejected from the pre-combustion chamber 2 into the main combustion chamber 1 to perform the work. Near the end of the exhaust stroke, the throat hole 6 is closed by the throat hole valve 4.

The combustion chamber structure of this gas engine is constructed as described above and its operation has the following features. In this gas engine, up until the first half of the compression stroke where the gas pressure in the pre-combustion chamber 2 is higher than the air pressure in the main combustion chamber 1, the gas fuel in such an amount as not to cause a self-ignition is ejected into the main combustion chamber 1 through the sub-communication holes 29, thus distributing the gas fuel to the main combustion chamber 1 and the pre-combustion chamber 2. Further, since the ports 20 of the sub-communication holes 29 opening on the main combustion chamber 1 side extend in an opposed relationship with each other toward the center of the center throat hole portion 21, when the gas fuel is jetted out from the pre-combustion chamber 2 into the main combustion chamber 1 in the first half of the compression stroke, the ejected gas fuel steams strike against one another in the central portion of the cylinder so that the gas fuel stays in the central area without dispersing to the cylinder periphery, thus preventing the gas fuel from entering the crevices of the piston.

Next, in the second half of the compression stroke when the pressure of the lean mixture in the main combustion chamber 1 is higher than the gas pressure in the pre-combustion chamber 2, a part of the compressed lean mixture in the main combustion chamber 1 is supplied, in such an amount as not to cause self-ignition of the gas fuel in the pre-combustion chamber 2, to the pre-combustion chamber 2 through the sub-communication holes 29 to prevent excess pressure rise of the compressed air in the main combustion chamber 1. The ports 19 of the sub-communication holes 29 opening on the pre-combustion chamber 2 side have their axes extending offset from the center of the pre-combustion chamber 2, so that the lean mixture flowing from the main combustion chamber 1 into the pre-combustion chamber 2 is introduced through the inclined ports 19 into the upper part of the pre-combustion chamber 2 as a swirling flow. Further, because the valve stem 32 of the throat hole valve 4 has a raised portion 47 around the outer circumference at a position demarcating the upper and lower parts of the pre-combustion chamber 2, the swirling flow in the upper part of the pre-combustion chamber 2 can be formed in good condition without dispersing into the lower part.

Next, near the top dead center during the compression stroke, the throat hole valve 4 opens the throat hole 6, allowing the high-temperature, high-pressure air (including a minute amount of lean mixture) present in the main combustion chamber 1 to rush into the pre-combustion chamber 2 to form an over-rich mixture in the lower part of the pre-combustion chamber 2 while the inrush air is guided by the raised portion 47 so as not to hinder the swirling flow formed in the upper part of the pre-combustion chamber 2. At the same time, a combustible mixture is formed in the upper part of the pre-combustion chamber 2. When the combustible mixture self-ignites, the pressure in the upper part of the pre-combustion chamber 2 increases, ejecting the over-rich mixture present in the intermediate and lower parts of the pre-combustion chamber 2 out into the main combustion chamber 1.

In the combustion chamber structure of this gas engine, the cross-sectional area of the sub-communication holes 29 to supply the lean mixture to the upper part of the pre-combustion chamber 2 is so set that when the throat hole valve 4 opens the throat hole 6, the temperature and pressure in the upper part of the pre-combustion chamber 2 reach the point that causes the self-ignition.

Figure 3:
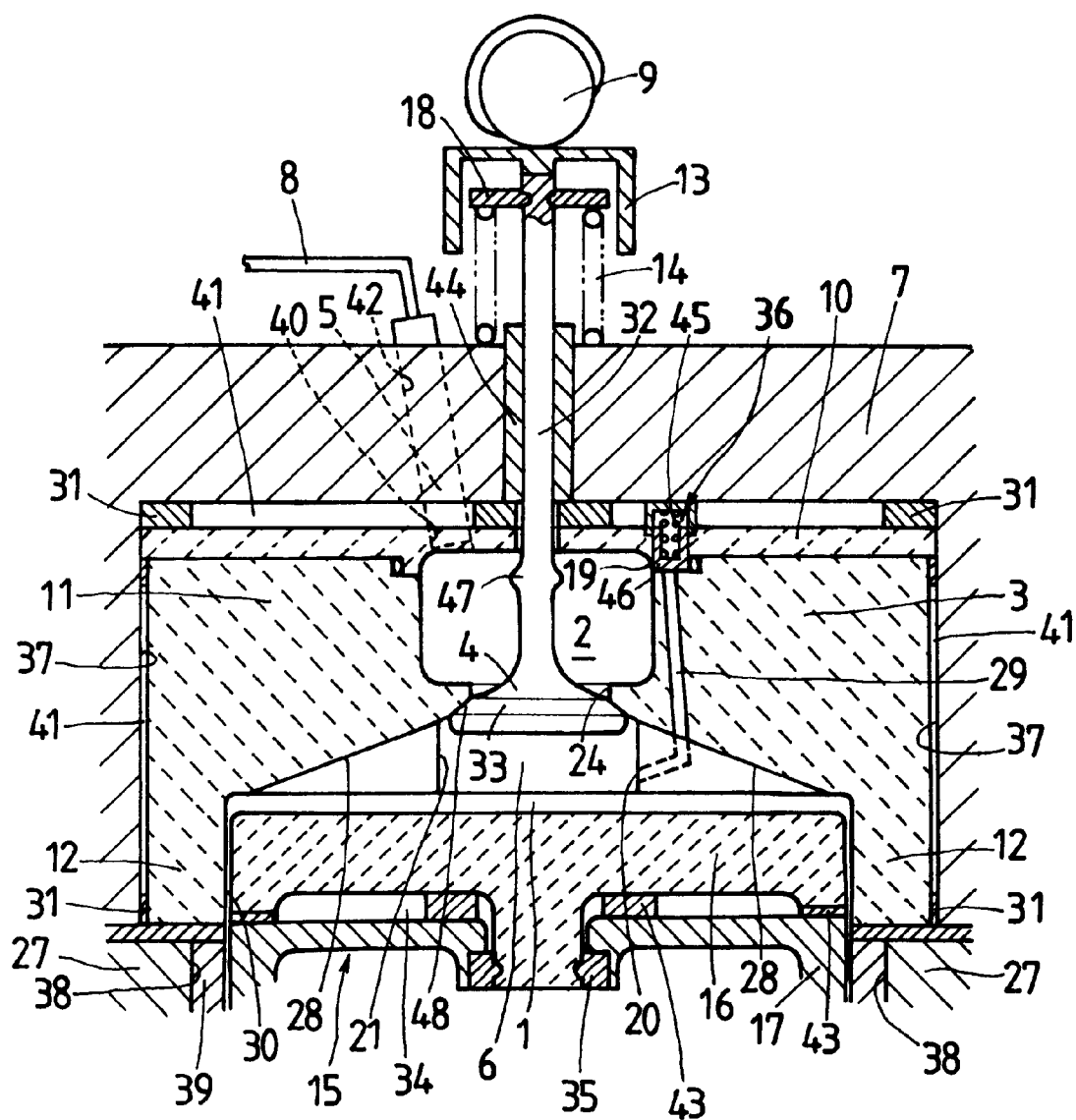
FIG. 3 is a cross section showing another embodiment of the combustion chamber structure of the gas engine.
Figure 4:
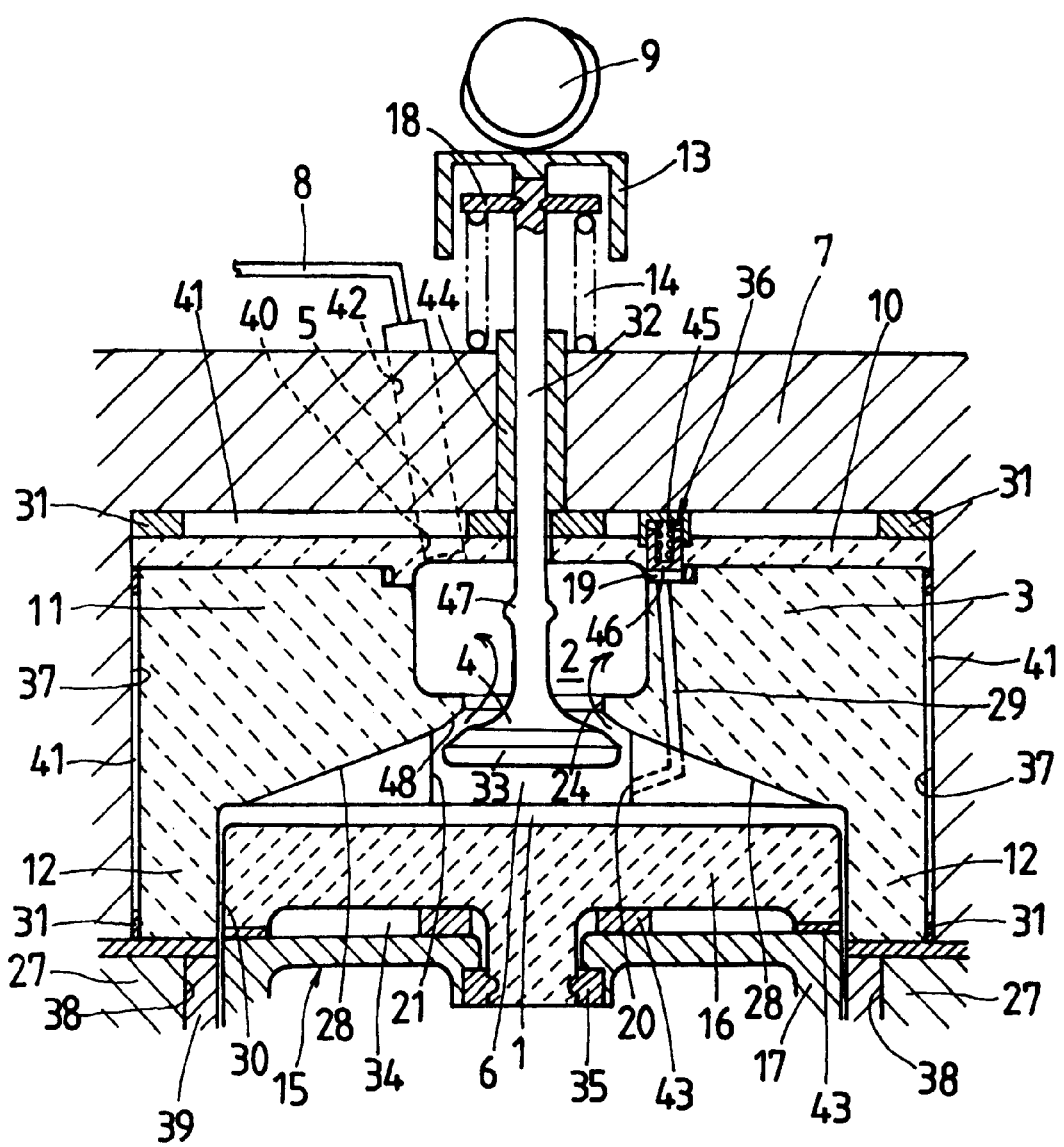
FIG. 4 is a cross section of the combustion chamber structure of FIG. 3 showing a pressure control valve in an open state.

Next, by referring to FIGS. 3 and 4, the second embodiment of the combustion chamber structure of the gas engine according to this invention will be described.

The second embodiment is similar to the first embodiment except that a pressure control valve is provided. Like reference numerals are assigned to the like parts and repetitive explanations are not given. The sub-communication hole 29 is provided with a pressure control valve 36 that open the sub-communication hole 29 when the gas pressure in the main combustion chamber 1 is a predetermined value higher than the gas fuel pressure in the pre-combustion chamber 2. The pressure control valve 36 comprises a plunger 46 and a return spring 45.

In the second embodiment, after a low-pressure gas fuel is charged into the pre-combustion chamber 2 with the throat hole valve 4 closed, when during the intake and compression strokes the pressure in the pre-combustion chamber 2 is higher than the pressure in the main combustion chamber 1, the sub-communication hole 29 is closed by the pressure control valve 36 so that there is no gas fuel flow from the pre-combustion chamber 2 to the main combustion chamber 1 eliminating the possibility of a pre-ignition. Only when the air pressure in the main combustion chamber 1 becomes higher than the gas pressure in the pre-combustion chamber 2 by a predetermined margin, does the air pressure move the plunger 46 against the force of the return spring 45 of the pressure control valve 36 to open the port 19 of the sub-communication hole 29 allowing the compressed air to flow from the main combustion chamber 1 to the pre-combustion chamber 2.

This prevents the compressed air pressure in the main combustion chamber 1 from being raised to an excessively high pressure. Further, because the compressed air has already been supplied into the upper part of the pre-combustion chamber 2, the opening of the throat hole 6 by the throat hole valve 4 immediately produces a combustible mixture in the upper part of the pre-combustion chamber 2 followed by ignition and combustion in that area. Once the upper part of the pre-combustion chamber 2 is ignited and burned, the increasing pressure in that area ejects the over-rich mixture in the intermediate and lower parts of the pre-combustion chamber 2 out into the main combustion chamber 1.

What is claimed is:

1. A combustion chamber structure of a gas engine, comprising:

combustion chamber members installed in a cylinder head and formed with main combustion chambers and pre-combustion chambers communicating with the main combustion chambers;

throat holes formed in the combustion chamber members to allow communication between the main combustion chambers and the pre-combustion chambers;

throat hole valves to open and close the throat holes;

fuel supply ports opening to the pre-combustion chambers to supply a gas fuel to the pre-combustion chambers;

fuel supply valves to open and close the fuel supply ports; and sub-communication holes opening at wall surfaces of the throat holes situated in the main combustion chambers and at upper wall surfaces of the pre-combustion chambers to allow communication between the main combustion chambers and the pre-combustion chambers;

wherein lower axes of the sub-communication holes opening into the main combustion chambers extend toward the centers of the throat holes, and upper axes of the sub-communication holes opening into the pre-combustion chambers extend offset from center axes of the pre-combustion chambers;

whereby gaseous fuel in said pre-combustion chambers is sprayed, early in a compression stroke during which said throat hole valves block off said throat holes, into said main combustion chambers, wherein lean fuel-air mixture is produced, and when a pressure in said main combustion chambers has risen late in the compression stroke, air in said main combustion chambers is admitted through said sub-communication holes into upper areas in said pre-combustion chambers, wherein swirls are formed in said upper areas in said pre-combustion chambers to produce the lean fuel-air mixture in said upper areas in the pre-combustion chambers and at the same time to push downward said gaseous fuel to lower ares in said pre-combustion chambers, where very fuel-rich mixture is produced, so that combustion begins in a boundary layer between said lean fuel-air mixture and said very fuel-rich mixture, and subsequently, on opening said throat hole valves, said very fuel-rich mixture in said lower areas in said pre-combustion chambers is sprayed early and thoroughly into said main combustion chambers, with no unburned gaseous fuel remaining in said pre-combustion chambers.

2. A combustion chamber structure of a gas engine according to claim 1, wherein valve stems of the throat hole valves extending along the center axes of the pre-combustion chambers are formed with raised portions around the circumference of the valve stem.

3. A combustion chamber structure of a gas engine according to claim 1, wherein the sub-communication holes are provided with pressure control valves that open the sub-communication holes in response to a gas pressure in the main combustion chambers which is a predetermined value higher than a gas fuel pressure in the pre-combustion chambers.

4. A combustion chamber structure of a gas engine according to claim 1, wherein the combustion chamber members comprise a head underside portion and a liner upper portion integrally formed with the head underside portion, both being made of ceramics.

5. A combustion chamber structure of a gas engine according to claim 1, wherein the throat hole comprise throat hole portions situated on the pre-combustion chamber side, center throat hole portions situated on the main combustion chamber side where the throat hole valves reciprocate, and communication grooves extending radially from the center throat hole portions toward cylinder periphery of the main combustion chambers.

6. A combustion chamber structure of a gas engine according to claim 1, wherein up until the first half of the compression stroke where the gas pressure in the pre-combustion chambers is higher than the air pressure in the main combustion chambers, the gas fuel supplied to the pre-combustion chambers is ejected out, in such a flow rate as not to cause self-ignition, into the main combustion chambers through the sub-communication holes to distribute the gas fuel to the main combustion chambers and the pre-combustion chambers, and then during the compression stroke where the air pressure in the main combustion chambers is higher than the gas pressure in the pre-combustion chambers, a part of the compressed lean air-fuel mixture is supplied in such an amount as not to cause self-ignition to the pre-combustion chambers from the main combustion chambers through the sub-communication holes to prevent the compressed air pressure from rising excessively high in the main combustion chambers.

* * * * *